United States Patent
Krasnoff (10) Patent No.: US 11,339,765 B2
(45) Date of Patent: May 24, 2022

(54) POWER TRANSMISSION SYSTEM

(71) Applicant: Duplicent, LLC, Santa Monica, CA (US)

(72) Inventor: Curren Emmett Krasnoff, Santa Monica, CA (US)

(73) Assignee: Duplicent, LLC, Santa Monica, CA (US)

( * ) Notice: Subject to any disclaimer, the term of this patent is extended or adjusted under 35 U.S.C. 154(b) by 0 days.

(21) Appl. No.: 17/437,613

(22) PCT Filed: May 20, 2021

(86) PCT No.: PCT/US2021/033426
§ 371 (c)(1),
(2) Date: Sep. 9, 2021

(87) PCT Pub. No.: WO2021/242605
PCT Pub. Date: Dec. 2, 2021

(65) Prior Publication Data
US 2022/0120259 A1    Apr. 21, 2022

Related U.S. Application Data

(60) Provisional application No. 63/031,126, filed on May 28, 2020.

(51) Int. Cl.
| | | |
|---|---|---|
| *H02K 7/02* | (2006.01) | |
| *F03G 3/00* | (2006.01) | |
| *H02K 11/00* | (2016.01) | |
| *H02K 7/18* | (2006.01) | |

(52) U.S. Cl.
CPC .......... *F03G 3/094* (2021.08); *H02K 7/1853* (2013.01); *H02K 11/0094* (2013.01)

(58) Field of Classification Search
CPC .... H02K 11/0094; H02K 7/1853; H02K 7/02; H02K 7/06
See application file for complete search history.

(56) References Cited

U.S. PATENT DOCUMENTS

| | | | |
|---|---|---|---|
| 3,248,967 A | 5/1966 | Lewis | |
| 4,926,107 A | 5/1990 | Pinson | |
| 6,060,804 A * | 5/2000 | Fujita | B06B 1/045 310/12.32 |

(Continued)

OTHER PUBLICATIONS

International Search Report and Written Opinion for International Application No. PCT/US2021/033426, dated Aug. 25, 2021, 12 pages.

*Primary Examiner* — Dang D Le
(74) *Attorney, Agent, or Firm* — Foley & Lardner LLP (57) ABSTRACT

A power transmission assembly includes a base, a rotating frame rotatably coupled to the base and configured to rotate about an axis, an output shaft coupled to the rotating frame, a weight selectively repositionable relative to the rotating frame, and a weight actuator configured to reposition the weight relative to the rotating frame to move the weight from a subtraction position located at a first height to an addition position located at a second height. The second height is greater than the first height such that a gravitational force on the weight drives the rotating frame to rotate about the axis and drive the output shaft.

12 Claims, 7 Drawing Sheets

(56) References Cited

U.S. PATENT DOCUMENTS

| | | | | |
|---|---|---|---|---|
| 6,734,574 B2* | 5/2004 | Shin | ............... | F03B 17/04 |
| | | | | 310/152 |
| 7,235,909 B2* | 6/2007 | Moe | ............... | H02K 49/10 |
| | | | | 310/152 |
| 10,495,071 B1 | 12/2019 | Jenkins | | |
| 2007/0090648 A1 | 4/2007 | Barksdale | | |
| 2012/0299308 A1 | 11/2012 | Kondo et al. | | |
| 2017/0045041 A1 | 2/2017 | Ishida | | |

* cited by examiner

POWER TRANSMISSION SYSTEM

CROSS-REFERENCE TO RELATED PATENT APPLICATION

This application claims the benefit of U.S. Provisional Patent Application No. 63/031,126, filed May 28, 2020, which is incorporated herein by reference its entirety.

BACKGROUND

The present disclosure relates generally to power transmissions. More specifically, the present disclosure relates to power transmissions that receive a first type of mechanical energy (e.g., linear movement of an object) as an input and output a second type of mechanical energy (e.g., rotational mechanical energy).

SUMMARY

At least one embodiment relates to a power transmission assembly including a base, a rotating frame rotatably coupled to the base and configured to rotate about an axis, an output shaft coupled to the rotating frame, a weight selectively repositionable relative to the rotating frame, and a weight actuator configured to reposition the weight relative to the rotating frame to move the weight from a subtraction position located at a first height to an addition position located at a second height. The second height is greater than the first height such that a gravitational force on the weight drives the rotating frame to rotate about the axis and drive the output shaft.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a power transmission is shown according to various exemplary embodiments. The power transmission includes a rotating frame or wheel that is rotatably coupled to a base. The wheel rotates about a substantially horizontal axis of rotation. In some embodiments, the wheel is coupled to an electromagnetic device such that rotation of the wheel drives the electromagnetic device to generate electrical energy. One or more weights are selectively repositionable relative to the wheel. Specifically, the weights are moved relative to the wheel by a weight actuator to drive rotation of the wheel.

According to one embodiment, the power transmission operates according to a cycle. At the beginning of the cycle, the weight is (a) coupled to the wheel, (b) offset a distance from the axis of rotation, and (c) located at an addition position relative to the wheel. The addition position is located at a first, elevated height. Gravity imparts a downward force on the weight. Due to the offset distance of the weight from the axis of rotation, the force of gravity imparts a moment load on the wheel, driving the wheel to rotate about the axis of rotation. As the wheel rotates, the weight moves downward, toward a subtraction position having a second height that is lower than the first height. When the wheel has rotated sufficiently for the weight to have reached the subtraction position, the weight actuator engages the weight, moving the weight relative to the wheel. The weight actuator returns the weight to the addition position where the weight is again coupled to the wheel, completing the cycle of operation. The cycle may be repeated to continue rotation of the wheel.

Figure 1:
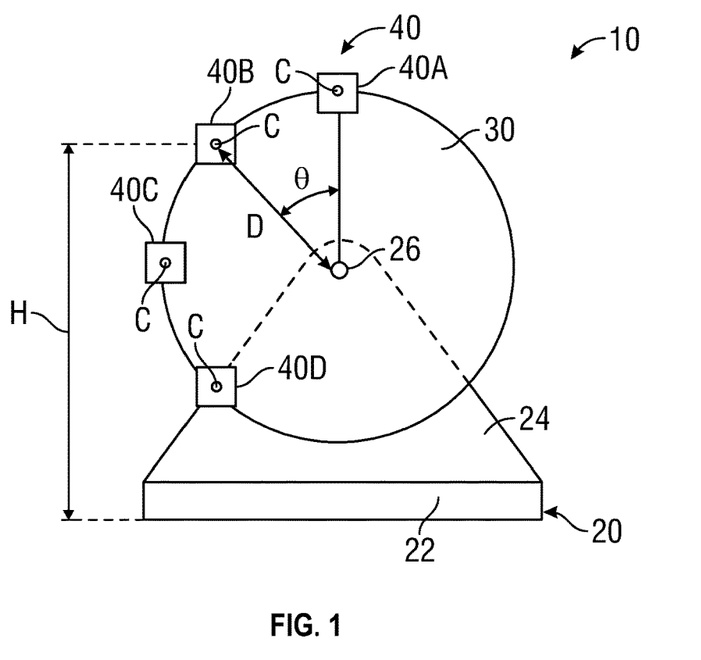
FIG. 1 is a front view of a power transmission system, according to various exemplary embodiments.
Figure 2:
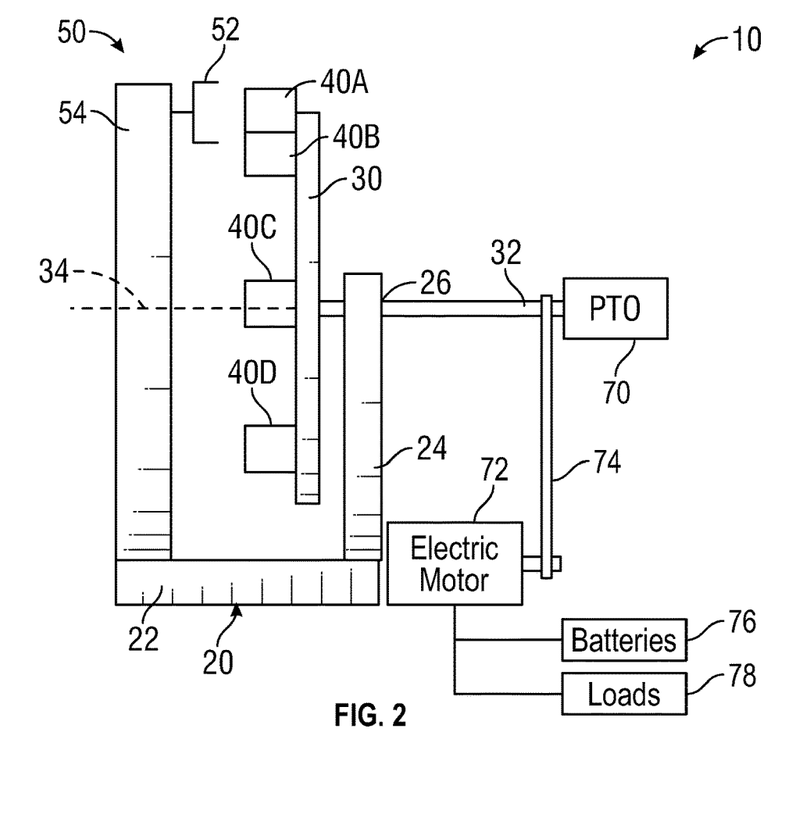
FIG. 2 is a right side view of the power transmission system of FIG. 1.

Referring to FIGS. 1 and 2, a power transmission system, wheel assembly, power transmission assembly, power transmission, power conversion assembly, or generator, is shown as system 10 according to an exemplary embodiment. The system 10 includes a chassis, frame, or base assembly, shown as base 20. The base 20 is configured to support the various components of the system 10. The base 20 includes a bottom portion, base portion, or horizontal portion, shown as foot 22 and a top portion, upper portion, or vertical portion, shown as support wall 24, that is fixedly coupled to the foot 22 and extends upward from the foot 22. The support wall 24 defines an aperture or passage, shown as output shaft passage 26, that extends through the support wall 24. The shaft passage 26 may be at least partially defined by a bushing or bearing that facilitates rotation of a shaft extending through the shaft passage 26 relative to the support wall 24.

The system 10 further includes a wheel, rotating frame, or rotating support structure, shown as wheel 30. The wheel 30 is fixedly coupled to a shaft, shown as output shaft 32. The output shaft 32 extends through the shaft passage 26, such that the output shaft 32 rotatably couples the wheel 30 to the base 20. The wheel 30 rotates about an axis of rotation, shown as axis 34. The axis 34 extends along the output shaft 32 (e.g., is centered about the output shaft 32). In some embodiments, the axis 34 extends substantially horizontally. In such embodiments, the wheel 30 rotates within a substantially vertical plane (e.g., a plane perpendicular to the horizontal axis 34).

The system 10 includes one or more weights 40 that are coupled to the wheel 30. Specifically, in the embodiment shown in FIG. 1, the weights 40 include a weight 40A, a weight 40B, a weight 40C, and a weight 40D. Each of the weights 40 may have the same mass, or one or more of the weights 40 may have different masses. Each weight 40 has a center of gravity C that is offset from a distance D from the axis 34. As shown in FIG. 1, the distance D is equal for each of the weights 40. In other embodiments, the weights 40 are positioned at different distances from the axis 34 such that the distance D varies for one or more of the weights 40. The center of gravity C of each weight 40 is positioned at a vertical position or height H. As shown, each height is measured relative to the bottom of the base 20. In other embodiments, the height H is measured from another location. The center of gravity C of each weight 40 is located at an angular position $\Theta$ that corresponds to the height H of the center of gravity C. As shown, the angular position $\Theta$ is 0 degrees when the corresponding height H of the weight 40 is maximized (e.g., at top dead center), and the angular position $\Theta$ is 180 degrees when the corresponding height H of the weight 40 is minimized (e.g., at bottom dead center). In other embodiments, the angular position $\Theta$ of each weight 40 is otherwise measured.

In some embodiments, the weights 40 are selectively repositionable relative to the wheel 30. In some embodiments, the weights 40 are selectively coupled to the wheel 30 such that the weights 40 are decoupled from the wheel 30 when the weights 40 are repositioned relative to the wheel 30. By way of example, the weights 40 may be decoupled (e.g., by disconnecting a latch or other mechanical coupler, by disconnecting the power supply to an electromagnet, etc.). In other embodiments, the weights 40 are slidably coupled to the wheel 30 such that the weights remain coupled to the wheel 30 while the weights 40 are repositioned relative to the wheel 30. By way of example, the weights 40 may be slidably coupled to a track positioned on the wheel 30 such that the weights 40 travel along the track.

Referring to FIG. 2, the system 10 includes an actuator, shown as weight actuator 50, that is configured to reposition the weights 40 relative to the wheel 30. In some embodiments, the weight actuator 50 includes a weight interface or end effector, shown as interface 52, and a height actuator or weight shifter, shown as lift 54. The interface 52 is configured to couple (e.g., selectively, continuously, permanently, etc.) the weights 40 to the weight actuator 50. With the weights 40 coupled to the interface 52, the lift 54 is configured provide mechanical energy to raise the weights 40 relative to the wheel 30. Accordingly, the weight actuator 50 is configured to lift or raise the weights 40 from a first, low elevation to a second, greater elevation. By way of example, the weight actuator 50 may raise the weight 40A from a height $H_1$ of 1 ft to a height $H_1$ of 5 ft.

Figure 3:
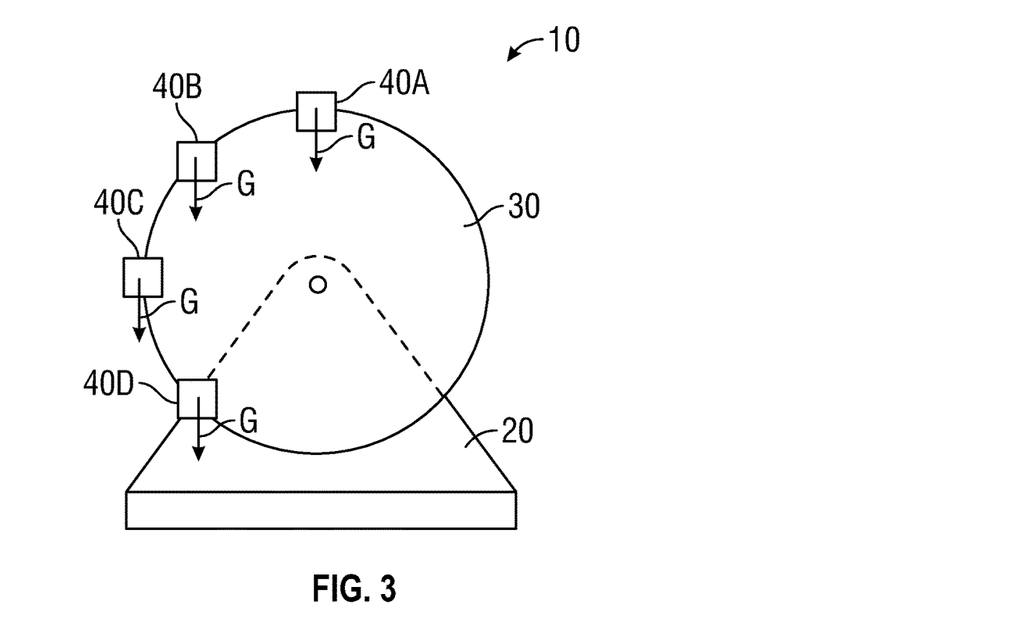
FIG. 3 is front view of the power transmission system of FIG. 1 in a first position.

Referring to FIGS. 3-6, an exemplary portion of a cycle of operation of the system 10 is shown according to an exemplary embodiment. In FIG. 3, the weights 40 are all coupled to the wheel 30. The weights 40 are all positioned on the wheel 30 such that the centers of gravity C of each of the weights 40 are all located on one side of the wheel (e.g., $0° < \Theta < 180°$). Gravity applies a downward gravitational force G onto each weight 40 at the corresponding center of gravity C. Due to the separation of the centers of gravity C from the axis 34, the gravitational force G on each weight 40 imparts a moment loading on the wheel 30, driving the wheel 30 to rotate in a first direction (e.g., counterclockwise as shown in FIG. 3). As the wheel 30 rotates, the horizontal distance between each center of gravity C and the axis 34 (i.e., the length of the moment arm) varies, varying the moment load imparted by each weight 40. The moment load M exerted by a given weight 40 can be calculated using the following equation:

$$M = GD \sin \Theta = mgD \sin \Theta \quad (1)$$

where G is the gravitational force on a given weight 40, D is the distance of the weight 40 from the axis 34, $\Theta$ is the angular position of the weight 40, m is the mass of the weight 40, and g is the acceleration due to gravity experienced by the weight 40 (e.g., 9.81 m/s$^2$). The moment effect of each weight 40 can be calculated separately and combined to determine the total moment load of the weights 40 on the wheel 30.

Figure 4:
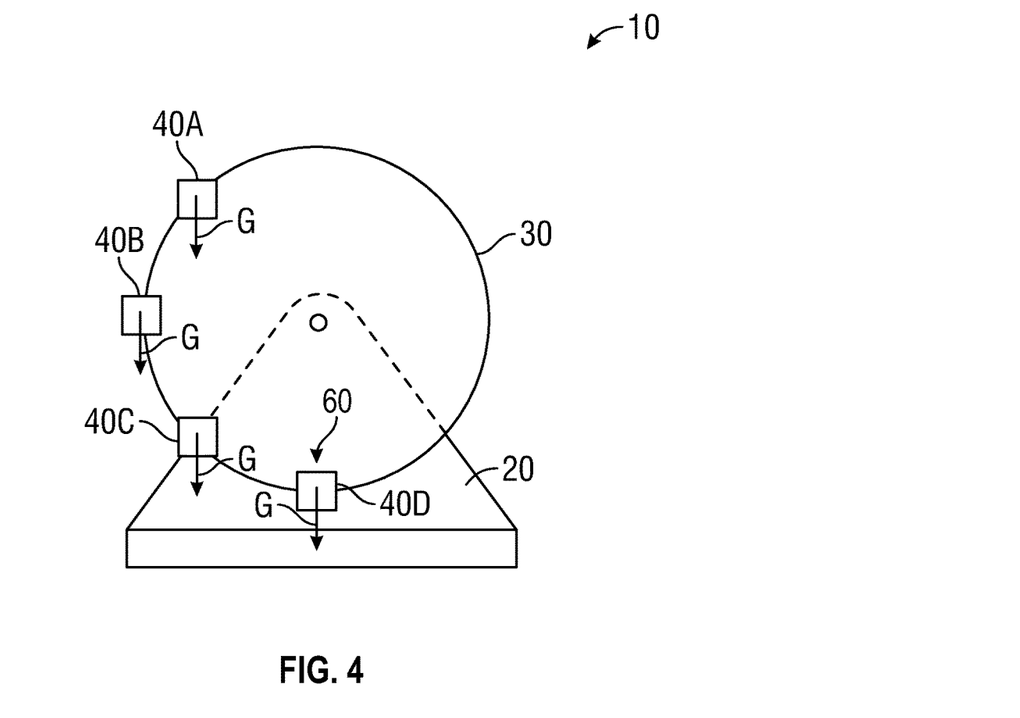
FIG. 4 is front view of the power transmission system of FIG. 1 in a second position.

Because each of the weights 40 are located on the left side of the wheel 30, the sum of the moment loads of the weights 40 is positive, and the wheel 30 is driven to rotate in the first direction. As the wheel 30 rotates, the weights 40 all move downward. As shown in FIG. 4, the weight 40D eventually reaches a position or range of positions (e.g., a bottom position or subtraction position), shown as subtraction position 60. The subtraction position 60 is fixed in space (e.g., relative to the base 20). In some embodiments, the subtraction position 60 corresponds to a bottom dead center position of the weight 40D (i.e., where the angular position $\Theta$ of the weight 40D is 180 degrees), such that the height H of the weight 40D would begin increasing if the wheel 30 rotated further in the first direction. In other embodiments, the subtraction position corresponds to a position of the weight 40D above bottom dead center (e.g., where the angular position $\Theta$ of the weight 40D is less than 180 degrees).

Figure 5:
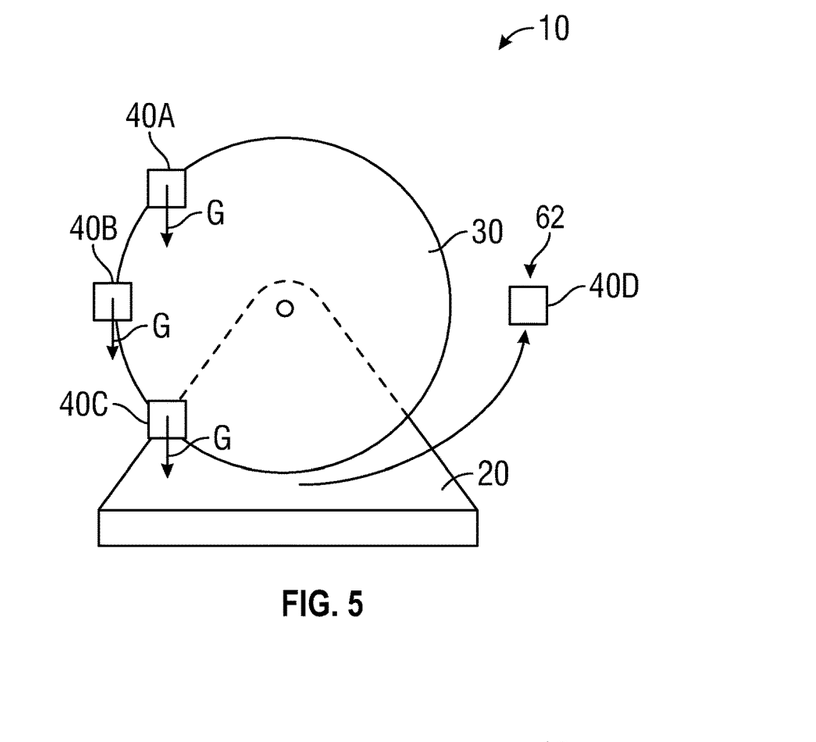
FIG. 5 is front view of the power transmission system of FIG. 1 in a third position.

When the weight 40D reaches the subtraction position 60, the interface 52 engages the weight 40D, and the lift 54 applies an upward force to the weight 40D, lifting the weight 40D. The weight actuator 50 may lift the weight 40D straight upward or along a path that moves upward and laterally (e.g., to avoid one or more obstacles). As shown in FIG. 5, the weight actuator 50 moves the weight 40D to an intermediate position 62. In some embodiments, the weight 40D is slidably coupled to the wheel 30 such that the weight 40D remains coupled to the wheel 30 while in the intermediate position 62. In other embodiments, the weight 40D is selectively coupled to the wheel 30, and the weight 40D is decoupled from and/or separated from the wheel 30 while in the intermediate position 62.

Figure 6:
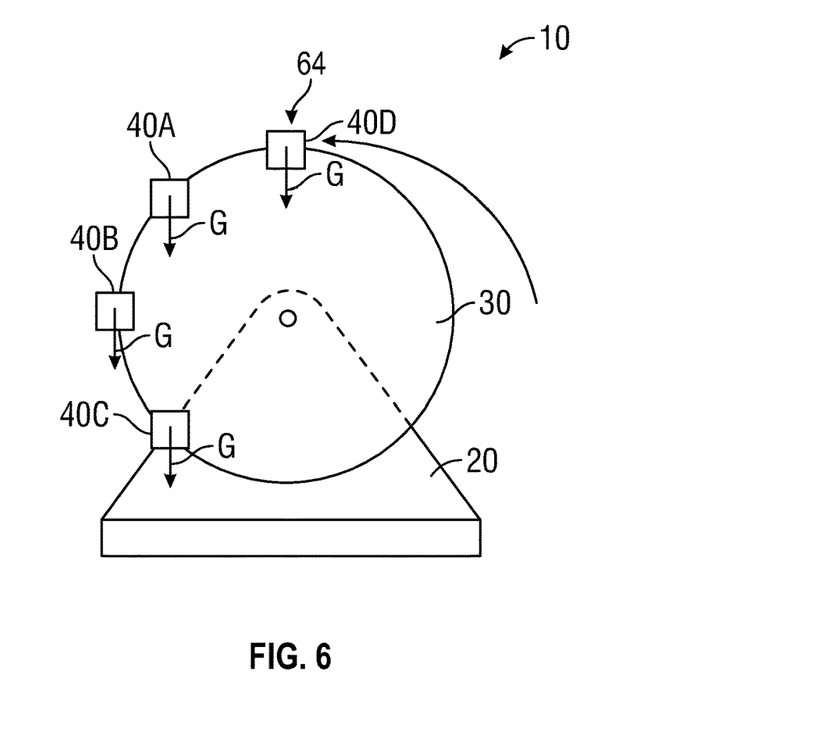
FIG. 6 is front view of the power transmission system of FIG. 1 in a fourth position.

As shown in FIG. 6, the weight actuator 50 moves the weight 40D to a position or range of positions (e.g., a top position or addition position), shown as addition position 64. The addition position 64 is fixed in space (e.g., relative to the base 20). In some embodiments, the addition position 64 corresponds to a top dead center position of the weight 40D (i.e., where the angular position $\Theta$ of the weight 40D is 0 degrees), such that the height H of the weight 40D would begin decreasing if the wheel 30 rotated further in the first direction. In other embodiments, the addition position 64 corresponds to a position of the weight 40D below top dead center (e.g., where the angular position $\Theta$ of the weight 40D is greater than 0 degrees).

When the weight 40D reaches the addition position 64, the weight 40D is again coupled (e.g., fixedly coupled, rotatably coupled, etc.) to the wheel 30 such that the weight 40D is again positioned at the distance D from the axis 34. With the weight 40D coupled to the wheel 30, the weight 40D again moves with the wheel 30. As the wheel 30 continues to rotate, the weight 40D moves downward until the weight 40D again reaches the subtraction position 60, and the cycle of operation shown in FIGS. 3-6 may be repeated to facilitate continuous rotation of the wheel 30.

The system 10 may also control the weight actuator 50 to lift the other weights (e.g., weights 40A, 40B, and 40C) to the addition position 64 in response to the weight reaching the subtraction position 60. By way of example, when the weight 40C reaches the subtraction position 60, the weight actuator 50 may engage the weight 40C and lift the weight 40C to the addition position 64 through the intermediate position 62. By way of another example, when the weight 40B reaches the subtraction position 60, the weight actuator 50 may engage the weight 40B and lift the weight 40B to the addition position 64 through the intermediate position 62. By way of another example, when the weight 40A reaches the subtraction position 60, the weight actuator 50 may engage the weight 40A and lift the weight 40A to the addition position 64 through the intermediate position 62. In this way, the system 10 maintains a cycle of operation that continuously replaces each weight 40 at an elevated position such that each weight 40 continues to drive the wheel 30 over time.

By utilizing multiple repositionable weights 40, the moment load on the wheel 30 may be increased, increasing the output torque that the system 10 is capable of delivering. Additionally, the use of multiple weights 40 facilitates applying a more consistent torque to the wheel 30. As the wheel 30 rotates, the moment load imparted by each weight 40 varies both (a) due to the variation in the length of the moment arm of the weight 40 as the wheel 30 rotates and (b) due to the reduction in torque when the weight 40 is being moved from the subtraction position 60 to the addition position 64. Adding more weights 40 to the system 10 reduces the effect of these variations in torque on the overall torque experienced by the wheel 30, as the torque provided by each weight 40 then makes up a lesser portion of the overall torque. By way of example, in a system 10 that includes only the weight 40D, the wheel 30 may experience no torque when the weight 40D is being moved from the subtraction position 60 to the addition position 64. However, in a system 10 that includes both the weight 40B and the weight 40D, the weight 40B continues to impart a moment load on the wheel 30 while the weight 40D is being moved from the subtraction position 60 to the addition position 64.

Referring again to FIG. 2, the torque imparted on the wheel 30 by the weights 40 is transferred by the output shaft 32. As shown in FIG. 2, the output shaft 32 is coupled to a power take off (PTO) output, shown as PTO 70. Specifically, the output shaft 32 is shown as being directly coupled to the PTO 70 such that the output shaft 32 drives the PTO 70. The output shaft 32 is coupled to an electromagnetic device or motor/generator, shown as electric motor 72. Specifically, a shaft of the electric motor 72 is coupled to the output shaft 32 by a power transmission (e.g., a gearbox, a chain and sprocket assembly, a belt and pulley assembly, a gear train, etc.), shown as belt 74. In other embodiments, the electric motor 72 is directly coupled to the output shaft 32. In other embodiments, the PTO 70 is coupled to the output shaft 32 by the belt 74 or another type of power transmission. In other embodiments, the PTO 70 and/or the electric motor 72 are omitted.

The PTO 70 may include one or more devices that receive and utilize rotational mechanical energy from the output shaft 32. The PTO 70 may include one or more devices that convert rotational mechanical energy to another form. By way of example, the PTO 70 may include a pump or compressor that receives rotational mechanical energy and provides a flow of a pressurized fluid (e.g., a gas, a liquid, etc.). By way of another example, the PTO 70 may include a generator that receives rotational mechanical energy and provides electrical energy. The PTO 70 may include one or more devices that utilize rotational mechanical energy to perform one or more functions. By way of example, the PTO 70 may include a wheel (e.g., as part of a drivetrain for a vehicle), a conveyor, an implement (e.g., a saw, a lathe, a mill, a washing machine, etc.), or another type of device.

The electric motor 72 may be configured to receive rotational mechanical energy and provide electrical energy. The electric motor 72 may provide alternating current or direct current electrical energy. The electric motor 72 may be configured to receive electrical energy and provide rotational mechanical energy. By way of example, the electric motor 72 may drive the wheel 30 and/or the PTO 70. Electrical energy provided (e.g., generated) by the electric motor 72 may be used to power any functions of the system 10.

In some embodiments, the system 10 includes one or more energy storage devices, shown as batteries 76. The batteries 76 may receive and store electrical energy provided by the electric motor 72. The batteries 76 may provide stored electrical energy to power the electric motor 72. The batteries 76 may include one or more lithium ion batteries, lead acid batteries, nickel metal hydride batteries, or other types of batteries. Additionally or alternatively, the system 10 may include another type of energy storage device, such as one or more capacitors.

In some embodiments, the system 10 includes one or more electrical loads, shown as loads 78. The loads 78 may be electrically coupled to the electric motor 72 and/or the batteries 76. The loads 78 may be configured to consume electrical energy from the electric motor 72 and/or the batteries 76. The loads 78 may additionally or alternatively be configured to provide electrical energy to the electric motor and/or the batteries 76. By way of example, the loads 78 may include electric motors, heating elements, electronics (e.g., controllers, displays, etc.), or other electrical loads. By way of another example, the loads 78 may include an electrical grid that consumes electrical energy from the system 10 and/or provides electrical energy to the system 10.

In some embodiments, it is advantageous to minimize the weight of the wheel 30 and maximize the weight of the weights 40. This arrangement maximizes the amount of output power provided by the system 10 for weights of a given size while minimizing the energy required to accelerate the wheel 30. In some embodiments, the wheel 30 includes relatively lightweight materials, such as aluminum or bamboo. In some embodiments, the weights 40 include relatively dense materials, such as lead, mercury, steel, or iron.

The path along which the weights 40 move between the subtraction position 60 and the addition position 64 may vary between different embodiments. In some embodiments, the weights 40 move straight upward, along the side of the wheel 40 or through the center of the wheel. In some embodiments, the path of the weights 40 curves such that the momentum of the weights 40 caused by spinning of the wheel 30 carries the weights 40 along the path. In some embodiments, the momentum of the weights 40 may carry the weights 40 up to 75% of the vertical distance back to the addition point 60 without expending any additional energy. The weights 40 may enter the addition positon 64 from above, below, of from the sides. By way of example, one weight 40 may be added from the rear side, and the subsequent weight 40 may be added from the front side.

The quantity, size, shape, and/or position of the weights 40 may vary between different embodiments. By way of example, the weights 40 may take up between 2% and 100% of the radius of the wheel 30. By way of another example, the system 10 may include two sets of weights 40, each set of weights being at a different distance D from the axis 34. The weights 40 may extend across a large portion (e.g., most, all, etc.) of the width of the wheel 30. By way of example, the weights 40 may have a width of 1 ft, 2 ft, 3 ft, 5 ft, 10 ft, 15 ft, 20 ft, or more.

Although only one weight actuator 50 is shown in FIG. 2, in some embodiments, the system 10 includes multiple weight actuators 50. By way of example, one weight actuator 50 may be positioned on each side of the wheel 30 to facilitate rapid movement of the weights 40 without the weight actuators 50 interfering with one another. In such embodiments, the width of the wheel 30 may be increased, and the weights 40 may be located at the center of the wheel 30 instead being of cantilevered off of one side of the wheel 30 to facilitate access from both sides of the wheel 30.

Figure 7:
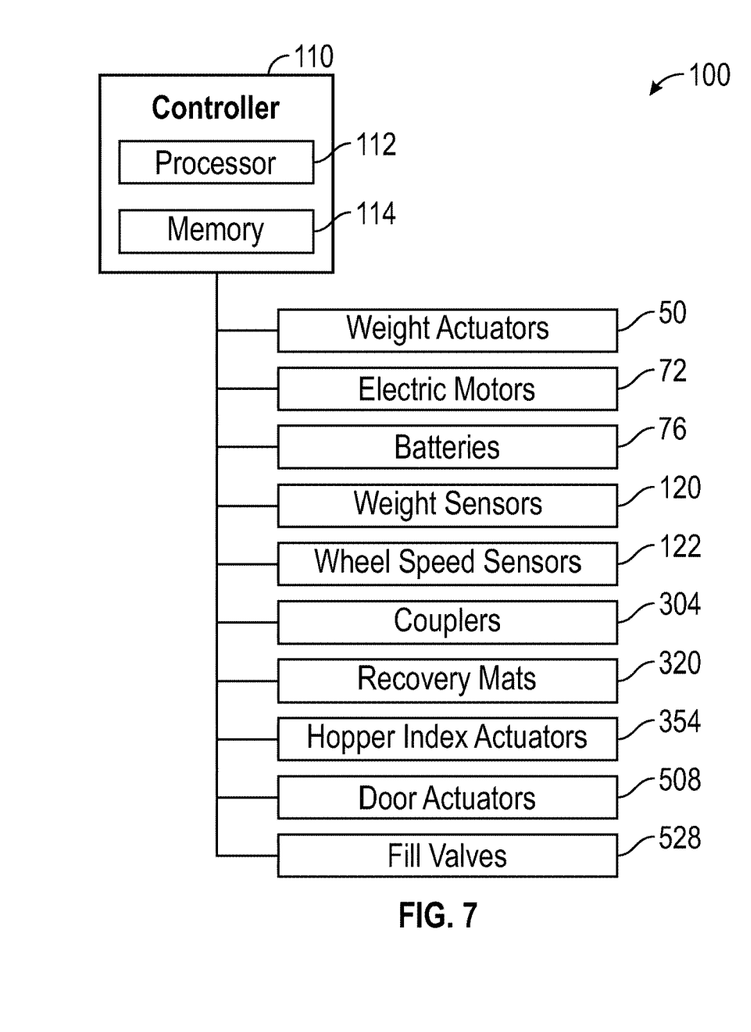
FIG. 7 is a block diagram of a control system for the power transmission system of FIG. 1, according to an exemplary embodiment.

Referring to FIG. 7, the system 10 includes a control system 100 including processing circuitry, shown as controller 110. The controller 110 includes a processor 112 and a memory device, shown as memory 114. The memory 114 may contain one or more instructions that are executed by the processor 112 to control operation of the system 10. The controller 110 is operatively coupled to the various components of the system 10. The controller 110 configured to receive information from various components of the system 10 and/or provide information (e.g., commands) to various components of the system 10.

In some embodiments, the controller 110 controls the weight actuator 50. Specifically, the controller 110 controls the weight actuator 50 to move the weights 40 from the subtraction position 60 to the addition position 64. By way of example, the controller 110 may control the interface 52 to engage a weight 40 at the subtraction position 60, control the lift 54 to raise the weight 40, and control the interface 52 to disengage the weight 40 from the lift 54 and/or couple the weight 40 to the wheel 30. The controller 110 may control the speed of the wheel 30 by varying the speed at which the weight actuator 50 moves the weights 40.

In some embodiments, the controller 110 controls the electric motor 72 and/or the batteries 76. By way of example, the controller 110 may electrically couple the electric motor 72 to the batteries 76 while controlling the weight actuator 50 to drive the electric motor 72 such that the electric motor 72 provides electrical energy to charge the batteries 76. By way of another example, the controller 110 may electrically couple the electric motor 72 to the batteries 76 and control the batteries 76 to power the electric motor 72. By way of another example, the controller 110 may electrically couple the electric motor 72 and/or the batteries 76 to the loads 78. The electric motor 72 and/or the batteries 76 may provide electrical energy to the loads 78. In embodiments where the loads 78 includes an electrical grid, the electrical grid may provide electrical energy to power the electric motor 72 and/or charge the batteries 76.

In some embodiments, the control system 100 includes one or more sensors, shown as weight sensors 120, that are operatively coupled to the controller 110. The weight sensors 120 are configured to provide data indicative of a position, orientation, or status (e.g., a fill level) of one or more weights 40. By way of example, the weight sensors 120 may include limit switches, proximity sensors, break beam sensors, or other sensors that provide data relating to a position of the weight 40. By way of another example, the weight sensors 120 may include a rotation sensor (e.g., an optical encoder or potentiometer, etc.) that indicates an angular position of the wheel 30. The controller 110 may utilize a predetermined relationship between the angular position of the wheel 30 and the positions of the weights 40 to determine the positions of the weights 40.

Figure 8:
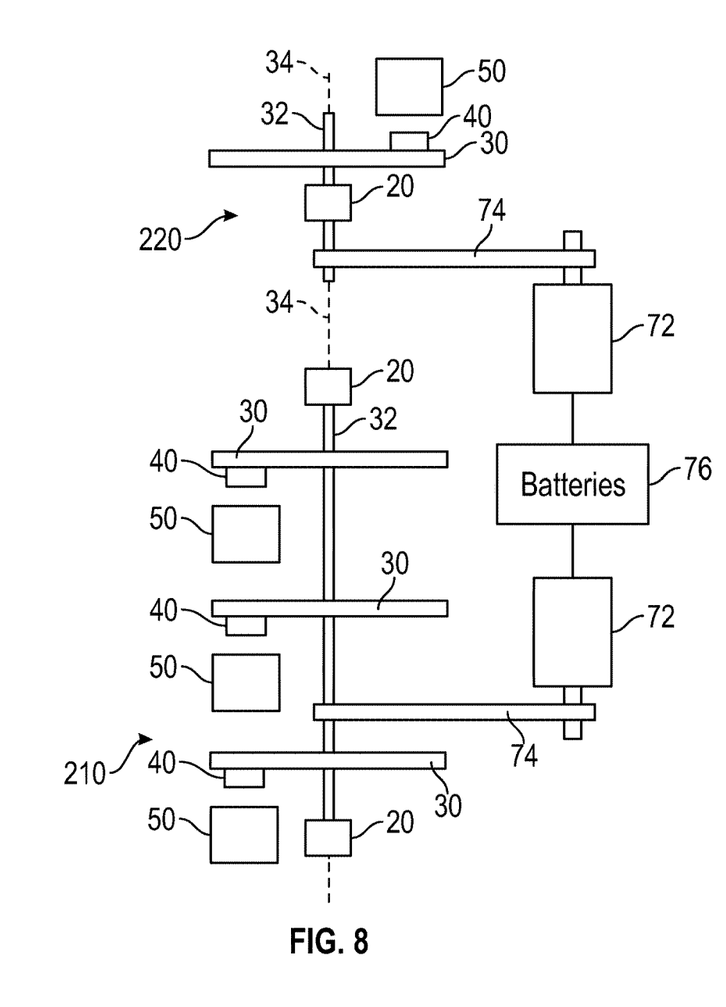
FIG. 8 is a top view of a system including several of the power transmission systems of FIG. 1, according to an exemplary embodiment.

Referring to FIG. 8, a power transmission system, shown as system 200 is shown according to an exemplary embodiment. The system 200 illustrates how several of the system 10 may be combined with one another. As shown, the system 10 includes a first subassembly, shown as wheel assembly 210. The wheel assembly 210 includes three of the wheels 30 arranged in series with one another. Specifically, three wheels 30 are each coupled to one output shaft 32. In other embodiments, the wheel assembly 210 includes more or fewer wheels 30 arranged in series with one another (e.g., 3, 5, 10, 20, 30, 50, 100, or more wheels 30). The output shaft 32 is rotatably supported by a pair of bases 20. The wheels 30 all rotate about a common axis 34 that extends through the output shaft 32. Each wheel 30 is driven by a corresponding weight actuator 50 that repositions one or more weights 40 relative to the wheel 30. The moment load of the weights 40 on each of the wheels 30 drives the output shaft 32. The output shaft 32 is connected to an electric motor 72 by a belt 74, such that all of the wheels 30 can drive and/or be driven by the electric motor 72. By utilizing multiple wheels 30 to drive one output shaft 32, the power output of the wheel assembly 210 may be increased relative to a system with only one wheel 30. In other embodiments, the wheel assembly 210 includes more or fewer wheels 30.

The wheels 30 may be fixedly coupled to the output shaft 32. Alternatively, the wheels 30 may be selectively coupled to the output shaft 32 by a clutch, ratchet, or one-way bearing. Such a configuration may permit the wheels 30 to rotate relative to one another. In some embodiments, a first wheel 30 may be coupled to the output shaft 32 after a second wheel 30 has already begun rotating, such that the momentum of the second wheel 30 imparts a torque on the first wheel 30, facilitating rotation of the first wheel 30. Such a configuration may be used to facilitate startup of rotation of the first wheel 30.

The system 200 further includes a second subassembly, shown as wheel assembly 220. The wheel assembly 220 includes one wheel 30 is coupled to an output shaft 32. The output shaft 32 is rotatably supported by a base 20. The wheel 30 is directly coupled to the output shaft 32 such that the wheel 30 rotates about an axis 34. The wheel 30 is driven by a weight actuator 50 that repositions one or more weights 40 relative to the wheel 30. The moment load of the weights 40 on the wheel 30 drives the output shaft 32. The output shaft 32 is connected to an electric motor 72 by a belt 74, such that the wheel 30 can drive and/or be driven by the electric motor 72.

In some embodiments, the electric motors 72 of the wheel assembly 210 and the wheel assembly 220 are both electrically coupled to a common set of batteries 76 (e.g., selectively coupled as controlled by the controller 110). Accordingly, the electric motors 72 may each receive electrical energy from the batteries 76 and/or supply electrical energy to the batteries 76. In some embodiments, the electrical energy from one wheel assembly may be used to drive the other wheel assembly. By way of example, the wheel assembly 210 may be operating at a high speed while the wheel assembly 220 is stationary or operating at a low speed. The electric motor 72 of the wheel assembly 210 may provide electrical energy that is supplied to the electric motor 72 of the wheel assembly 220 to drive the wheel 30 of the wheel assembly 220. Such a configuration may be used to facilitate startup of one of the wheel assemblies.

Figure 9:
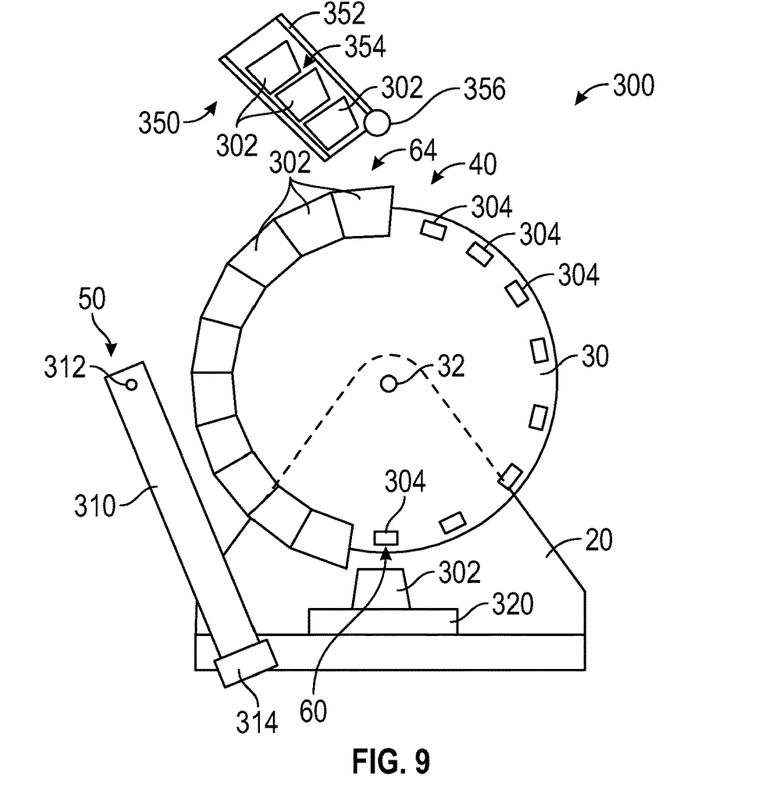
FIG. 9 is a front view the power transmission system of FIG. 1, according to an exemplary embodiment.

Referring to FIG. 9, a power transmission system, wheel assembly, power transmission assembly, power transmission, power conversion assembly, or generator, is shown as system 300. The system 300 represents one possible arrangement of the generic system 10. Accordingly, any description with reference to the system 10 may apply to the system 300, except as otherwise stated.

The weights 40 of the system 300 include a plurality of weights 302. Each of the weights 302 forms a discrete piece that is selectively coupled to the wheel 30. As shown, the system 300 includes eleven weights 302. In other embodiments, the system 300 includes more or fewer weights 302. As shown, the weights 302 are positioned along a circumference of the wheel 30. In some embodiments, the weights 302 are rigid. In other embodiments, the weights 302 are flexible. By way of example, the weights 302 may bend into a concave shape when inserted into a track that extends along the circumference of the wheel 30.

The weights 302 may be shaped to facilitate densely packing the weights 302 with few gaps between the weights 302. As shown, the weights 302 are shaped as trapezoidal prisms that extend along the axis 34. Adjacent surface of the weights 302 engage one another, minimizing gaps between the weights 302 and maximizing the mass that can be supported by the wheel 30. In other embodiments, the weights 302 are otherwise shaped. By way of example, the weights 302 be shaped as triangular prisms that each have a triangular cross section. In such an embodiment, adjacent surfaces of the weights 302 may engage one another, similarly to the trapezoidal weights 302 of FIG. 9. By way of another example, the weights 302 may have a rectangular cross section. In some such embodiments, the weights 302 are flat plates that can be packed closely to one another. By way of another example, the weights 302 may have circular or other shaped cross sections. In some embodiments, the system 300 includes weights having a variety of different shapes (e.g., weights 302 with triangular cross sections positioned between weights 302 with rectangular cross sections).

The weights 302 may be selectively coupled to the wheel 30 such that the weights 302 may be decoupled from the wheel 30 when the weights 302 reach the subtraction position 60. As shown, the system 300 includes a plurality of couplers 304 that selectively couple (e.g., selectively rotatably couple, selectively fixedly couple, etc.) one or more of the weights 302 to the wheel 30. The controller 110 may control the couplers 304 to decouple the corresponding weights 302 from the wheel 30 when the weight 302 reaches the subtraction position 60. The system 300 may include one coupler 304 that couples each of the weights 302 to the wheel 30. In other embodiments, each coupler 304 couples multiple weights 302 to the wheel 30. In some embodiments, the coupler 304 includes an electromagnet that may be activated to magnetically couple one or more weights 302 to the wheel 30. In some embodiments, the coupler 304 includes a suction port coupled to a vacuum pump that applies suction to couple one or more weights to the wheel 30. In some embodiments, the coupler 304 includes a clutch, latch, grabber, solenoid, or other device that mechanically engages one or more weights 302 to couple the one or more weights 302 to the wheel 30.

In some embodiments, the weights 302 are otherwise selectively coupled to the wheel 30. By way of example, the system 300 may include a track that surrounds a portion of the wheel 30 extending between the addition position 64 and the subtraction position 60. A weight 302 may be dropped into a recess defined by the wheel 30 at the addition position 64. The recess may extend radially outward such that the weight 302 is captured within the recess and prevented from moving along the circumference of the wheel. As the wheel 30 rotates, the wheel 30 may force the weight 302 into engagement with the track, which prevents the weight 302 from exiting the recess. The track may end immediately before the subtraction position 60 such that the weight 302 is permitted to exit the recess at the subtraction position 60 due to the force of gravity.

Referring still to FIG. 9, the weight actuator 50 includes a movable structure or rotating structure, shown as arm 310. The arm 310 is coupled to at least one actuator or lift, shown as motor 312, that is configured to control motion of the arm 310. As shown, the motor 312 controls rotation of the arm 310 about an axis of rotation that extends substantially parallel to the axis 34. Additionally or alternatively, the motor 312 may control translational movement, articulation (e.g., bending), and/or telescoping (i.e., a change in length) of the arm 310. Positioned at the end of the arm 310 is an interface (e.g., an electromagnet, a claw or grabber, a vacuum, etc.), shown as end effector 314, that is configured to selectively couple the weight 302 to the arm 310. In operation, the end effector 314 engages each weight 302 after the weight 302 has reached the subtraction position 60. The motor 312 then causes the arm 310 to raise the weight 302 to an elevated position. With the weight 302 in the elevated position, the end effector 314 disengages the weight 302 from the arm 310, permitting the weight 302 to be coupled to the wheel 30 at the addition position 64 (e.g., by the coupler 304). In some embodiments, the arm 310 and/or the end effector 314 are configured to rotate the weights 302 to facilitate depositing the weights 302 in the alignment position 64 with the weights 302 in a desired orientation.

As shown in FIG. 9, the system 300 includes an electrical energy generator, energy capturer, or recovery platform, shown as recovery mat 320. The recovery mat 320 is positioned below the subtraction position 60 such that the weights 302 fall onto the recovery mat 320 after decoupling from the wheel 30. Accordingly, the recovery mat 320 experiences the impact force from the falling weight 302. The recovery mat 320 compresses or deflects below the weight 302, receiving the kinetic energy from the weight 302 and slowing the weight 302 to a stop. The weight actuator 50 may then recover the weight 302 from atop the recovery mat 320 and move the weight 302 to the elevated position. In other embodiments, the recovery mat 320 is omitted.

The recovery mat 320 may be configured to convert a portion of the kinetic energy from the falling weight 302 to electrical energy. By way of example, the recovery mat 320 may include a platform positioned along a top surface of the recovery mat 320 hat is configured to move vertically. The platform may be coupled to one or more electric motors or generators, such that movement of the platform drives the electric motors to provide electrical energy. The electrical energy provided by the electric motors may be used to power other components of the system 300 (e.g., to drive the weight actuator 50, to charge the batteries 76, etc.). The force of the weight 302 may drive the platform downward, thereby driving the electric motors. After the weight 302 has been removed from the recovery mat 320, the motors may drive the platform upward to reset the position of the platform. In one example, the platform is supported by one or more linear actuators, and the linear actuators are coupled to the motor. Accordingly, the linear actuators may couple the movement of the platform to the movement of the electric motors.

Referring still to FIG. 9, the system 300 further includes a holding bay, holding area, hopper, or staging assembly, shown as hopper assembly 350. The hopper assembly 350 temporarily stores the weights 302 after the weights 302 are raised by the weight actuator 50 until the weights 302 are coupled to the wheel 30. The hopper assembly 350 facilitates immediate introduction of the weights 302 to the wheel 30 regardless of the position of the arm 310. As shown, the hopper assembly 350 includes a hopper body 352 that defines a passage 354 that receives and contains one or more of the weights 302. The weight actuator 50 deposits the weights 302 at a first end of the passage 354, and the weights 302 exit an opposing, second end of the passage 354 to be introduced back to the wheel 30 at the addition position 64. An actuator assembly, shown as hopper index actuator 356, is coupled to the hopper body 352 adjacent the second end of the passage 354. The hopper index actuator 356 includes an index wheel that engages the weights 302 within the passage 354 that is driven by an electric motor. With the hopper index actuator 356 stationary, the hopper index actuator 356 prevents the weights 302 from exiting the passage 354. The hopper index actuator 356 may be driven to dispense a weight 302 onto the wheel 30. In other embodiments, the hopper assembly 350 is omitted, and the weight actuator 50 moves the weights 302 directly onto the wheel 30 at the addition position 64.

In some embodiments, the arm 310 is configured to move along a path that utilizes the momentum of the weights 302 caused by motion of the wheel 30. By way of example, a weight 302 at the subtraction position 60 may have momentum that would continue to carry the weight 302 horizontally away from the wheel 30. The path of the arm 310 after the end effector 314 engages the weight 302 may initially move the weight 302 in the first direction, such that the momentum 302 of the weight 302 moves the weight 302 along the path without any energy being consumed by the motor 312. When the momentum has been depleted, the motor 312 may begin to drive the arm 310 to complete the movement of the weight 302 to the hopper assembly 350 or the addition position 64.

Figure 10:
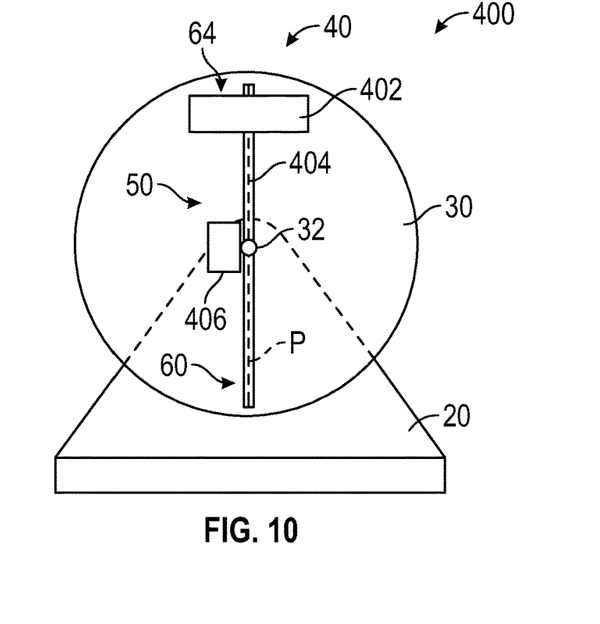
FIG. 10 is a front view the power transmission system of FIG. 1, according to another exemplary embodiment.

Referring to FIG. 10, a power transmission system, wheel assembly, power transmission assembly, power transmission, power conversion assembly, or generator, is shown as system 400. The system 400 represents one possible arrangement of the generic system 10. Accordingly, any description with reference to the system 10 may apply to the system 400, except as otherwise stated.

The system 400 includes a weight 402. The weight 402 is a discrete piece that is slidably coupled to the wheel 30. Specifically, the system 400 includes a guide, slide, or track, shown as track 404, that is coupled (e.g., fixedly coupled) to the wheel 30. The track 404 is slidably coupled to the weight 402 (e.g., by one or more bushings or bearings) such that the weight 402 moves along a path P defined by the track 404. As shown, the path P is centered about the track 404 and extends along the track 404. Accordingly, the weight 402 is selectively repositionable relative to the wheel 30 about along the track 404.

The weight actuator 50 of the system 400 includes an actuator (e.g., an electric motor, an electric linear actuator, etc.), shown as weight actuator 406, that is configured to move the weight 402 along the track 404. The weight actuator 406 is coupled to the wheel 30 and the weight 402. By way of example, the weight actuator 406 may include a linear actuator that is coupled to the weight 402 and configured to reposition the weight 402 along the track 404. By way of another example, the weight actuator 406 may drive a belt or a rack gear that is fixedly coupled to the weight 402 such that the weight 402, thereby driving the weight 402 along the track 404.

As shown in FIG. 10, the track 404 extends perpendicular to the output shaft 32, and the track 404 is aligned with the output shaft 32. Accordingly, the path P of the weight 402 intersects the axis 34 of the wheel 30. The weight 402 travels radially relative to the axis 34 as the weight 402 moves along the path P. Accordingly, as the weight 402 travels along the path P, the distance between the weight 402 and the axis 34 varies, changing the moment of inertia of the weight 402 about the axis 34. As shown, the track 404 extends on both sides of the output shaft 32. Accordingly, as the weight 402 moves along the track 404, the moment of inertia of the weight 402 decreases as the weight 402 moves toward the axis 34, then increases as the weight 402 moves beyond the axis 34. In other embodiments, the path of the weight 402 extends on only one side of the axis 34.

In operation, the weight 402 may begin in the addition position 64 with the weight 402 located at a first end of the path P, such that the gravitational force on the weight 402 drives the weight 402 and the wheel 30 to rotate about the axis 34 (e.g., counterclockwise as shown in FIG. 10). When the weight 402 reaches the subtraction position 60 (e.g., reaches a predetermined positions, reaches a predetermined range of positions, etc.), the controller 110 activates the weight actuator 406 to move the weight 402 along the track 404 toward the axis 34. This reduces the moment load of the force of gravity on the weight 402 that would oppose counterclockwise movement of the wheel 30. In embodiments where the path P and the track 404 extend on both sides of the axis 34, such as the embodiment of FIG. 10, the controller 110 may control the weight actuator 406 to continue moving the weight 402 beyond the axis 34, toward the second end of the path P, where the gravitational force on the weight 402 again drives the weight 402 and the wheel 30 to rotate counterclockwise. In embodiments where the path P and the track 404 extends on only one side of the axis 34, the controller 110 may control the weight actuator 406 to retain the weight 402 as close to the axis 34 possible (e.g., near the axis 34, at the axis 34). In this position, the moment load of the force of gravity on the weight 402 that would oppose counterclockwise movement of the wheel 30 is minimized as the wheel 30 continues to rotate (e.g., due to momentum, due to the effect of other weights 402, due to an input from the electric motor 72, etc.). Once the wheel 30 has rotated sufficiently for the first end of the path P to approach e.g., fall within a threshold range of positions relative to) the addition position 64, the controller 110 may control the weight actuator 406 to return the weight 402 to the first end of the path P, where the gravitational force on the weight 402 again drives the wheel 30 to rotate clockwise.

In other embodiments, the system 400 includes multiple weights 402. By way of example, the system 400 may include multiple tracks 404, each track 404 supporting a different weight 402. The tracks 404 may have differing lengths. By way of example, the system 400 may include one track 404 that extends across the axis 34 and two additional tracks 404 that extend on only one side of the axis 34. The movement of each weight 402 may be controlled individually by a corresponding weight actuator 406.

Figure 11:
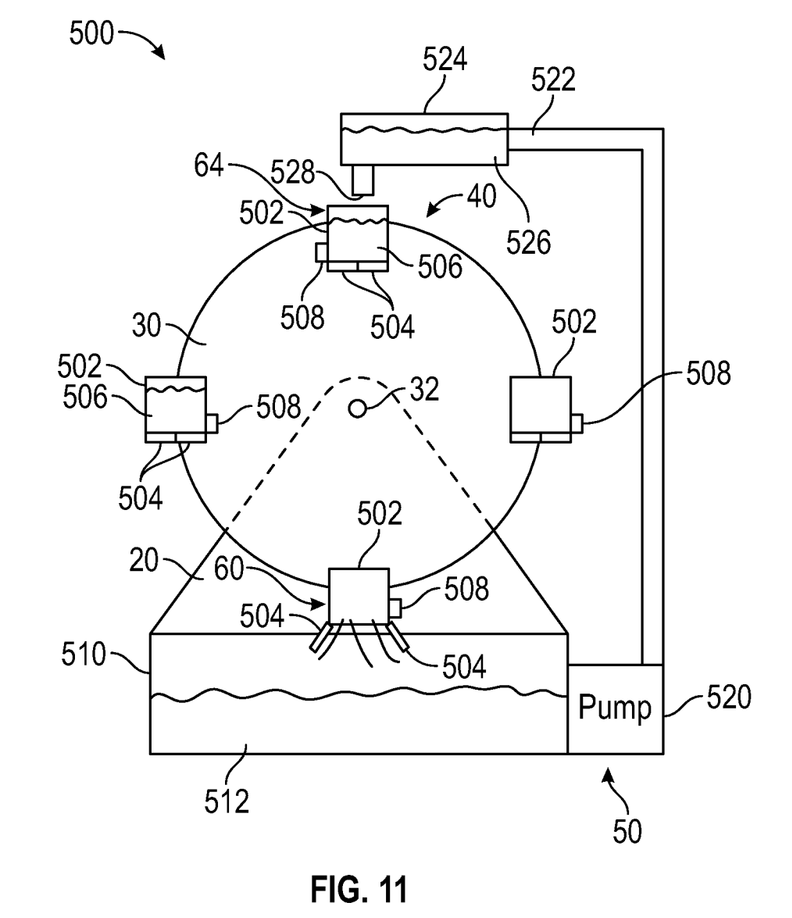
FIG. 11 is a front view the power transmission system of FIG. 1, according to another exemplary embodiment.

Referring to FIG. 11, a power transmission system, wheel assembly, power transmission assembly, power transmission, power conversion assembly, or generator, is shown as system 500. The system 500 represents one possible arrangement of the generic system 10. Accordingly, any description with reference to the system 10 may apply to the system 500, except as otherwise stated.

The weights 40 of the system 500 include volumes of flowable material that are held within containers coupled to the wheel 30. As used herein, the term "flowable material" can refer to any collection of molecules, particles, elements, or objects that are capable of flowing into a container. A flowable material can include liquids, solids, or a combination thereof. By way of example, the flowable material may include materials that are liquid at room temperature and atmospheric pressure, such as water, mercury, oil, or alcohol. The flowable material may include bulk solids, granules, grains, balls, pellets, fragments, pieces, powders, or other flowable forms of materials that are solid at room temperature and atmospheric pressure. By way of example, the flowable material may include sand, soil, gravel, metal balls or powders (e.g., lead pellets, steel ball bearings, steel cubes, iron powder, etc.), salt, grains (e.g., corn, rice, etc.), sugar, plastic pellets, or glass beads.

Referring still to FIG. 11, the system 500 includes a plurality of containers, compartments, or vessels (e.g., buckets, cups, tanks, etc.), shown as buckets 502 that are coupled to the wheel 30. Although the buckets 502 are shown as being square, the buckets 502 may be otherwise shaped, (e.g., triangular, rectangular, spherical, cylindrical, etc.). Each bucket 502 defines a volume or recess. As shown, each bucket 502 is rotatably coupled to the wheel 30 such that the buckets 502 maintain a substantially constant orientation relative to the direction of gravity as the wheel 30 rotates. As shown, coupled to the bottom of each bucket 502 is a valve or release, shown as a pair of doors 504, that are selectively repositionable relative to the bucket 502. In a closed configuration (e.g., as shown in the uppermost bucket 502 of FIG. 11), the doors 504 seal against the bucket 502, preventing flowable material from exiting the bucket 502. In an open configuration (e.g., as shown in the lowermost bucket 502 of FIG. 11), the doors 504 open to permit the flowable material to leave the bucket 502 through an aperture defined at the bottom of the bucket 502.

During operation, the buckets 502 are filled with a volume 506 of flowable material when in the addition position 64. In some embodiments, the volume 506 is a predetermined amount of flowable material. The weight of the volume 506 of flowable material forces the bucket 502 downward, driving rotation of the wheel 30 (e.g., counterclockwise as shown in FIG. 11). When the bucket 502 reaches the subtraction position 60, an actuator (e.g., a latch, one or more linear actuators, etc.), shown as door actuator 508, moves the doors 504 of the bucket 502 to the open configuration, permitting the volume 506 of flowable material to fall into a container, vessel, holding bay, or tank, shown as bottom tank 510. In some embodiments, the door actuator 508 is operated by the controller 110 (e.g., using electronic signals). In other embodiments, the door actuator 508 is mechanically actuated (e.g., the door actuator 508 engages a protrusion coupled to the base 20 when the wheel 30 reaches a predetermined position, causing the door actuator 508 to open the doors 504). In some embodiments, the bottom tank 510 is offset to the left as shown in FIG. 11 to ensure that any flowable material dispensed prior to the bucket 502 entering the subtraction position 60 is captured. After the volume 506 has been emptied from the bucket 502, the door actuator 508 closes the doors 504, and the bucket 502 moves back toward the addition position 64. Alternatively, the door actuator 508 may open the doors 504 while the bucket 502 is between the subtraction position 60 and the addition position 64, or while the bucket 502 is at the addition position 64.

In some embodiments, each bucket 502 includes an actuated pushing mechanism (e.g., a plunger) that actively forces the flowable material out of the bucket 502 and into the bottom tank 510. The pushing mechanism may dispense the flowable material more quickly than gravity, which may facilitate faster rotation speeds of the wheel 30. The pushing mechanism may also be configured to displace a consistent amount of flowable material each time (e.g., by controlling the stroke length of the pushing mechanism). In some embodiments, the amount of flowable material dispensed is configured to completely empty the bucket 502.

The bottom tank 510 contains a volume 512 of flowable material. The volume 512 may be larger than the volume 506. In the system 500, the weight actuator 50 includes an elevator, lift, or actuator, shown as pump 520, that is fluidly coupled to the bottom tank 510 and to a conduit (e.g., a pipe, tube, hose, etc.), shown as pipe 522. The pump 520 is configured to drive a portion of the flowable material from the volume 512 within the bottom tank 510, through the pipe 522, to a container, vessel, holding bay, or tank, shown as top tank 524, that is fluidly coupled to the pipe 522. The pump 520 may be powered by electrical energy from the electric motor 72 and/or the battery 76. In some embodiments, the system 500 utilizes multiple pumps 520 (e.g., in series, in parallel).

The top tank 524 contains a volume 526 of the flowable material. The top tank 524 is fluidly coupled to a dispenser, shown as fill valve 528. The fill valve 528 is configured to control a flow of material from the top tank 524 into the buckets 502. In some embodiments, the fill valve 528 is configured to dispense a predetermined amount (e.g., a predetermined volume, a predetermined mass, etc.) of the flowable material into each bucket 502. In some embodiments, the fill valve 528 forms a seal with each bucket 502 when the bucket 502 is in the addition position 64 to minimize spillage of the flowable material while the bucket 502 is being filled. By way of example, the bucket 502 may include a door that opens when the fill valve 528 is in close proximity to the bucket 502, and the fill valve 528 may form a seal with the door. In some embodiments, the fill valve 528 includes an actuated pushing mechanism (e.g., a plunger) that actively forces the flowable material into the bucket 502. The pushing mechanism may dispense the flowable material more quickly than gravity, which may facilitate faster rotation speeds of the wheel 30. The pushing mechanism may also be configured to displace a consistent amount of flowable material each time (e.g., by controlling the stroke length of the pushing mechanism). In some embodiments, the amount of flowable material dispensed is configured to completely fill each bucket 502.

In other embodiments, the buckets 502 are fixedly coupled to the wheel 30, such that the buckets 502 rotate with the wheel 30. In such embodiments, the flowable material may automatically be poured from the buckets 502 when the buckets 502 near the subtraction position 60, as the rotation of the wheel 30 inverts the buckets 502. In such embodiments, the doors 504 and/or the door actuators 508 may be omitted. In other embodiments, another type of elevator is utilized to move the flowable material from the bottom tank 510 to the top tank 524. By way of example, the elevator may include one or more buckets or containers coupled to a conveyor. The conveyor drives the buckets along a path such that the buckets scoop the flowable material from the bottom tank 510 and pour the flowable material into the top tank 524.

In other embodiments, the system 500 includes a conveyor or elevator (e.g., driven by pulleys and/or gears) that exchanges the bottom tank 510 with the top tank 524 after the bottom tank 510 is filled. By way of example, the conveyor may raise the bottom tank 510 above the wheel 30 such that the fill valve 528 dispenses flowable material from the bottom tank 510. By way of another example, the conveyor may lower the top tank 524 below the wheel 30 to receive the flowable material from the buckets 502. In some embodiments, additional tanks are introduced into this rotation to form a queue of tanks that are ready to be swapped into position above or below the wheel 30. This may reduce any potential spillage of flowable material while the tanks are being exchanged.

Figure 12:
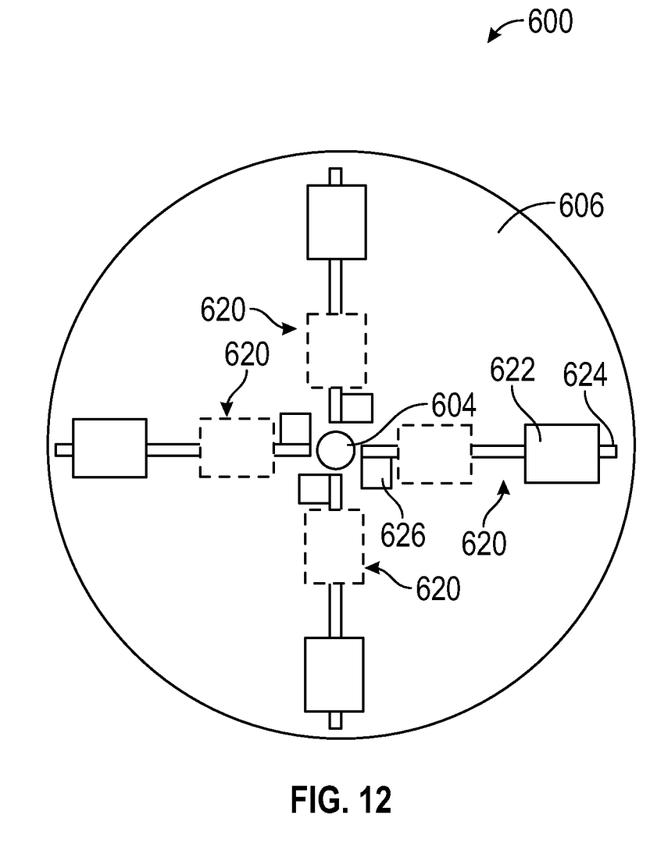
FIG. 12 is a top view of a power transmission system, according to an exemplary embodiment.
Figure 13:
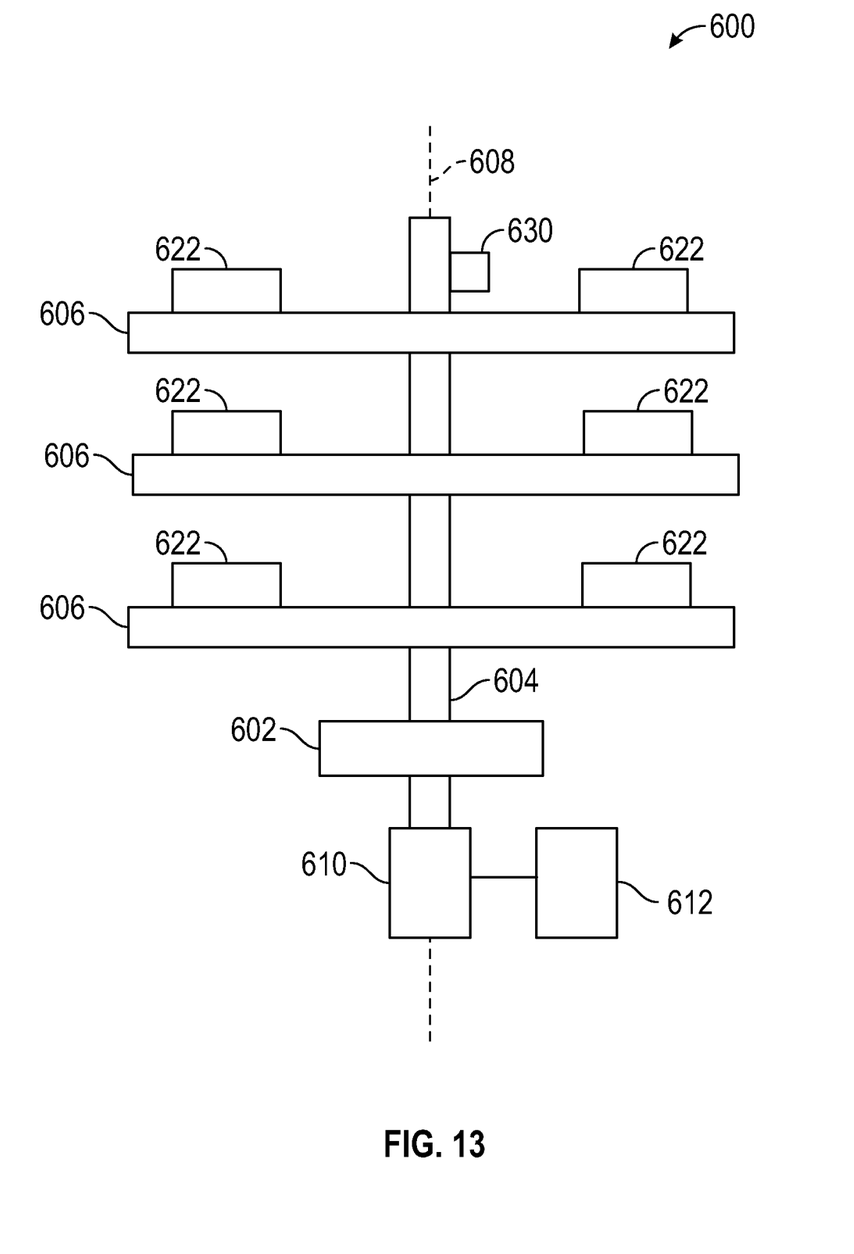
FIG. 13 is a front view of the power transmission system of FIG. 12.

Referring to FIGS. 12 and 13, a power transmission system, wheel assembly, power transmission assembly, power transmission, power conversion assembly, speed governor, or energy storage device, generator, is shown as system 600, according to an exemplary embodiment. The system 600 may be substantially similar to the system 10, except as otherwise specified herein.

The system 10 includes a chassis, frame, or base assembly, shown as base 602, configured to support the other components of the system 600. The base 602 defines an aperture that receives a shaft support shaft, shown as output shaft 604. A series of wheels, rotating frames, or rotating support structures, shown as wheels 606, are coupled (e.g., fixedly coupled, selectively coupled by one or more clutches, etc.) to the output shaft 604. The output shaft 604 and the wheels 606 rotate about an axis of rotation, shown as axis 608. The axis 608 extends along the output shaft 604 (e.g., is centered about the output shaft 604). In some embodiments, the axis 608 extends substantially vertically. In such embodiments, the wheels 606 each rotate within a substantially horizontal plane (e.g., a plane perpendicular to the axis 608). In other embodiments, the axis 608 is otherwise oriented. By way of example, the axis 608 may extend substantially horizontally. In such embodiments, the wheels 606 each rotate within a substantially vertical plane (e.g., a plane perpendicular to the axis 608).

The output shaft 604 is coupled to an electromagnetic device or motor/generator, shown as electric motor 610. The electric motor 610 is electrically coupled to an energy storage device (e.g., batteries, capacitors, etc.), shown as batteries 612. In some configurations, the output shaft 604 drives the electric motor 610 to produce electrical energy that is stored within the batteries 612. In other configurations, the electric motor 610 receives electrical energy from batteries 612 and drives the output shaft 604. The output shaft 602 is further coupled to a speed sensor or rotation sensor (e.g., an optical encoder), shown as rotation sensor 630. The rotation sensor 630 is configured to provide sensor data indicative of a rotational speed of the output shaft 602 and/or the wheels 606.

The system 600 includes a series of sliding weight assemblies 620 coupled to each wheel 606. FIG. 12 illustrates the arrangement of the sliding weight assemblies 620 on the uppermost wheel 606, although it should be understood that each of the wheels 606 may have a similar arrangement. Each sliding weight assembly 620 includes a weight 622 that is slidably coupled to a guide, shown as track 624. The tracks 624 are each coupled to one of the wheels 606. The tracks 624 are each oriented extending radially outward relative to the axis 608. The weights 622 are repositionable along the length of each track 624 between an outermost position (shown in solid lines in FIG. 12) and an innermost position (shown in dashed lines in FIG. 12). The weights 622 are moved along the tracks 624 by an actuators (e.g., an electric motor driving a belt or rack gear, an electric linear actuator, etc.), shown as weight actuators 626. The weight actuators 626 may be powered by the batteries 612. Operation of the electric motor 610, the batteries 612, and the weight actuators 626 may be controlled by a controller (e.g., the controller 110). The controller may control these functions based on sensor data from the rotation sensor 630.

During operation, the weights 622 begin in their outermost positions, and the wheels 606 are driven to a starting speed by the electric motor 610, at which point the system 600 contains an initial amount of kinetic energy. The kinetic energy may be used to perform one or more functions (e.g., to drive a PTO similar to the PTO 70, to drive the electric motor 610 to generate electric energy, due to frictional losses, etc.). As the kinetic energy in the system 600 decreases, the wheels 606 begin to rotate more slowly. In response to a decrease in speed of the wheels 606 (e.g., as sensed by the rotation sensor 630), the weight actuators 626 drive the weights 622 toward the innermost positions. This decreases the moment of inertia of the system 600, increasing the speed of the wheels 606 until a desired speed (e.g., the starting speed). A controller may repeat this process until all of the weights 622 are at the innermost positions. At this point, the electric motor 610 may drive the wheels 606 to maintain the desired speed, and the weight actuators 626 may return the weights 622 to the outermost positions.

In some embodiments, all of the weights 622 move toward the axis 608 in unison. In other embodiments, a first subset of the weights 622 initially move toward the axis 608, and a second subset of the weights 622 begin moving toward the axis 608 after the first subset reach the innermost positions. In some embodiments, each sliding weight assembly 620 includes multiple weights 622 positioned on each track 624 (e.g., 2, 3, 4, 5, 6, 7, or more weights 622). Once one of the weights 622 reaches the innermost position, the next weight 622 may begin moving toward the axis 608. This process may repeat for each weight 622.

In some embodiments, each wheel 606 has a relatively large diameter to facilitate an extended travel of the weights 622. By way of example, the wheels 606 may be 25 ft, 50 ft, 100 ft 1000 ft, 5000 ft or greater in diameter. The heights of the wheels 606 may be relatively small to facilitate stacking multiple wheels 606. In some embodiments, the system 600 includes more or fewer wheels 606 (e.g., 1, 2, 4, 5, 6, 7, 8, 9, 10, 15, 20, 30, 50, 100, or more wheels 606). In some embodiments, the output shaft 604 is coupled to multiple electric motors 610. In some embodiments, the output shaft 604 is coupled to the electric motors 610 through a power transmission (e.g., a gear train).

In some embodiments, it is advantageous to minimize the weight of the wheels 606 and the output shaft 604 and maximize the weight of the weights 622. This arrangement maximizes the amount of output power provided by the system 600 for weights 622 of a given size while minimizing the energy required to accelerate the wheels 606. In some embodiments, the wheel 606 includes relatively lightweight materials, such as aluminum or bamboo. In some embodiments, the weights 622 include relatively dense materials, such as lead, mercury, steel, or iron.

In some embodiments, the tracks 624 and/or the weights 622 include a ratchet assembly that selectively prevents outward movement of the weights 622. Such a ratchet assembly may apply an inward force on the weights 622 to limit outward movement of the weights 622 during rotation.

The ratchet assembly may be released to permit the weights 622 to return to their outermost positions (e.g., automatically due to rotation of the system 600, without the application of any energy by the weight actuators 626).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system 10 as shown in the various exemplary embodiments is illustrative only. Additionally, any element disclosed in one embodiment may be incorporated or utilized with any other embodiment disclosed herein. For example, the wheel assembly 210 of FIG. 8 may include both the system 300 of FIG. 9 and the system 400 of FIG. 10. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A power transmission assembly, comprising:
a base;
a rotating frame rotatably coupled to the base and configured to rotate about an axis;
a container coupled to the rotating frame;
an output shaft coupled to the rotating frame;
a weight selectively coupled to and repositionable relative to the rotating frame, wherein the weight is a volume of flowable material received by the container; and
a weight actuator configured to reposition the weight relative to the rotating frame to move the weight from a subtraction position located at a first height to an addition position located at a second height,
wherein the second height is greater than the first height such that a gravitational force on the weight drives the rotating frame to rotate about the axis and drive the output shaft, and
wherein the weight is decoupled from the rotating frame in response to the weight entering the subtraction position.

2. The power transmission assembly of claim 1, wherein the weight is a first weight, further comprising a second weight selectively repositionable relative to the rotating frame, wherein the weight actuator is configured to reposition the second weight relative to the rotating frame from the subtraction position to the addition position.

3. The power transmission assembly of claim 2, further comprising a controller operatively coupled to the weight actuator and configured to control the weight actuator to reposition the second weight relative to the rotating frame from the subtraction position to the addition position while the gravitational force on the first weight drives the rotating frame to rotate about the axis.

4. The power transmission assembly of claim 3, wherein the axis is a substantially horizontal axis.

5. The power transmission assembly of claim 1, further comprising an electromagnetic device coupled to the output shaft, wherein the electromagnetic device is configured to receive rotational mechanical energy from the output shaft and generate electrical energy.

6. The power transmission assembly of claim 5, further comprising:
an energy storage device configured to store electrical energy; and
a controller configured to configured to electrically couple the energy storage device to the electromagnetic device such that the electromagnetic device drives rotation of the rotating frame in response to a startup request for the power transmission assembly.

7. The power transmission assembly of claim 1, wherein the flowable material includes a liquid.

8. The power transmission assembly of claim 1, wherein the flowable material includes a solid.

9. The power transmission assembly of claim 1, further comprising a hopper assembly configured to contain the weight, wherein the weight actuator is configured to reposition the weight relative to the rotating frame from the subtraction position to the hopper assembly, and wherein the hopper assembly is configured to dispense the weight into the container at the addition position.

10. The power transmission assembly of claim 1, wherein the rotating frame is a first rotating frame, the weight is a first weight, the weight actuator is a first weight actuator, further comprising:
a second rotating frame rotatably coupled to the base and configured to rotate about the axis;
a second weight selectively repositionable relative to the second rotating frame; and
a second weight actuator configured to reposition the second weight relative to the second rotating frame such that a gravitational force on the second weight drives the second rotating frame to rotate about the axis and drive the output shaft.

11. A power transmission assembly, comprising:
a base;
a rotating frame rotatably coupled to the base and configured to rotate about an axis;
a track coupled to the rotating frame;
an output shaft coupled to the rotating frame;
a weight selectively repositionable relative to the rotating frame, wherein the weight is slidably coupled to the track such that the weight is selectively repositionable relative to the rotating frame along a path defined by the track, wherein the axis intersects the path such that the weight is repositionable to a position in which the axis intersects the weight; and
a weight actuator configured to reposition the weight relative to the rotating frame to move the weight from a subtraction position located at a first height to an addition position located at a second height,
wherein the second height is greater than the first height such that a gravitational force on the weight drives the rotating frame to rotate about the axis and drive the output shaft.

12. A power transmission assembly, comprising:
a first base;
a first rotating frame rotatably coupled to the first base and configured to rotate about a first axis;
a first output shaft coupled to the first rotating frame;
a first weight selectively repositionable relative to the first rotating frame; and
a first weight actuator configured to reposition the first weight relative to the first rotating frame to move the first weight from a subtraction position located at a first height to an addition position located at a second height, wherein the second height is greater than the first height such that a gravitational force on the first weight drives the first rotating frame to rotate about the first axis and drive the first output shaft;
a second base;
a second rotating frame rotatably coupled to the second base and configured to rotate about a second axis;
a second output shaft coupled to the second rotating frame;
a second weight selectively repositionable relative to the second rotating frame;
a second weight actuator configured to reposition the second weight relative to the second rotating frame such that a gravitational force on the second weight drives the second rotating frame to rotate about the second axis and drive the second output shaft;
a first electromagnetic device coupled to the first output shaft; and
a second electromagnetic device coupled to the second output shaft,
wherein the first electromagnetic device is configured to provide electrical energy to the second electromagnetic device such that the second electromagnetic device drives the second rotating frame.

\* \* \* \* \*